US008166076B2

(12) United States Patent
Chen et al.

(10) Patent No.: US 8,166,076 B2
(45) Date of Patent: Apr. 24, 2012

(54) DIGITAL MEDIA METADATA MANAGEMENT

(75) Inventors: Gang Chen, Sammamish, WA (US);
Robert Hildreth, Bellevue, WA (US);
Darren R. Davis, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 701 days.

(21) Appl. No.: 11/715,512

(22) Filed: Mar. 8, 2007

(65) Prior Publication Data
US 2008/0222201 A1    Sep. 11, 2008

(51) Int. Cl.
*G06F 17/30* (2006.01)
(52) U.S. Cl. ..................................... 707/803
(58) Field of Classification Search .................. 707/803
See application file for complete search history.

(56) References Cited

U.S. PATENT DOCUMENTS

| 6,072,983 | A | 6/2000 | Klosterman |
| 6,389,409 | B1 | 5/2002 | Horovitz et al. |
| 6,578,030 | B1 | 6/2003 | Wilmsen et al. |
| 6,874,146 | B1 * | 3/2005 | Iyengar ................ 719/313 |
| 6,970,840 | B1 | 11/2005 | Yu et al. |
| 7,036,137 | B1 | 4/2006 | Arsenault et al. |
| 2003/0200314 | A1 | 10/2003 | Giffin |
| 2003/0233241 | A1 | 12/2003 | Marsh |
| 2004/0039754 | A1 | 2/2004 | Harple, Jr. |
| 2004/0078807 | A1 | 4/2004 | Fries et al. |
| 2005/0165816 | A1 | 7/2005 | Schiller et al. |
| 2005/0182792 | A1 * | 8/2005 | Israel et al. ................ 707/104.1 |
| 2007/0118498 | A1 * | 5/2007 | Song et al. ........................ 707/1 |
| 2007/0269044 | A1 * | 11/2007 | Bruestle .......................... 380/54 |

FOREIGN PATENT DOCUMENTS

WO    WO9935849 A1    7/1999

OTHER PUBLICATIONS

"About the Union Catalog", http://mic.imtc.gatech.edu/catalogers_portal/cat_unicatlg.htm, Dec. 14, 2006.
Jenny, Darzentas, "Sharing Metadata: Enabling on Line Information Provision", http://www.iatul.org/conference/proceedings/vol09/papers/darzenta.html, May 31, 1999.

* cited by examiner

*Primary Examiner* — Neveen Abel Jalil
*Assistant Examiner* — Kevin L Young
(74) *Attorney, Agent, or Firm* — Mayer & Williams P.C.

(57) ABSTRACT

Network-side and client-side systems and techniques for managing metadata items describing digital media content available from a number of digital media content sources are described. Disparate metadata items are collected and transcribed based on a common format. The common format facilitates computerized cataloging, searching, and presentation of relevant metadata and/or digital content via a wide variety of client-side devices. The common format includes: a portion for storing descriptive data derived from the original metadata items; a portion for storing data specific to the digital media content source supplying the original metadata; and a services specifier portion used for accessing specific digital media content. The common format may be used to identify relationships between transcribed items of metadata based on virtually unlimited selection criteria, and to facilitate the creation and presentation to users of data sets of related metadata and/or digital media content.

10 Claims, 5 Drawing Sheets

DIGITAL MEDIA METADATA MANAGEMENT

BACKGROUND

Providers of digital media content (for example, video, audio, images, graphics, documents, spreadsheets, and multimedia content) use metadata to describe available digital media content to potential recipients. Metadata is any descriptive or identifying information in computer-processable form that is associated with an item of digital media content.

Commercial digital media providers often supply metadata to consumers using proprietary formats or protocols. In some cases, consumers need special-purpose electronic devices for receiving the metadata. For example, broadcast or downloadable digital media content may be described in catalogs or program guides published by particular media service providers via various communication networks such as cable networks, satellite communication networks, radio frequency networks, and the Internet.

Non-commercial digital media content (for example, personal media content such as photos, music, videos, playlists, and the like) is frequently serendipitously described by creators, using formats or protocols as varied as the manners in which the media content may be created or published.

It is desirable to collect and manage metadata that describes digital media content available from a variety of sources, and to represent such metadata in a manner that allows people using a wide variety of general-purpose electronic devices to discover and access relevant metadata and associated digital media content, while at the same time preserving the monetary opportunities available to commercial digital media providers.

SUMMARY

Aspects of managing metadata items that describe digital media content are described herein. Disparate items of time-based and non-time-based metadata from a number of digital media content sources are identified and collected. The disparate metadata items are transcribed to a common format, which in one portion includes a common schema for the metadata items. The common schema is used to facilitate the computerized cataloging, discovery, searching, and presentation of relevant metadata and/or digital media content. Relevant metadata and/or digital media content can be accessed via a variety of network-side or client-side environments to provide a personal experience to a user. In addition, the common format provides information to enable potentially richer and proprietary access to the content and its associated metadata by contacting the digital media content source directly.

Using the common schema, relationships between transcribed items of metadata (and corresponding digital media content) are identified, and data sets are formed. Data sets are built (and saved or established "on the fly") based on virtually unlimited metadata selection criteria and combinations thereof, such as user information, client-side or server-side operating environment characteristics or capabilities, business rules, temporal references, content-related information, advertising criteria, and the like, which may be predetermined or determined dynamically. A unified catalog of transcribed metadata items is optionally formed. Data sets may be stored in a single computer or using distributed computing techniques, and may be stored in client-side or network-side electronic memories such as temporary memories (for example, cache memories) or permanent memories, for unified presentation to, and navigation by, a user.

A network-side metadata management system (a Web service, for example) employs a number of protocol adapters/interfaces for communicating with specific particular digital media content sources and specific types of client-side devices. Such communication may be initiated by the metadata management system or a particular source, and data push or pull techniques may be employed. Client-side metadata management systems may be thin clients, such as Web browsers, or rich clients.

This Summary is provided to introduce a selection of concepts in a simplified form. The concepts are further described in the Detailed Description section. Elements or steps other than those described in this Summary are possible, and no element or step is necessarily required. This Summary is not intended to identify key features or essential features of the claimed subject matter, nor is it intended for use as an aid in determining the scope of the claimed subject matter. The claimed subject matter is not limited to implementations that solve any or all disadvantages noted in any part of this disclosure.

DETAILED DESCRIPTION

Figure 1:
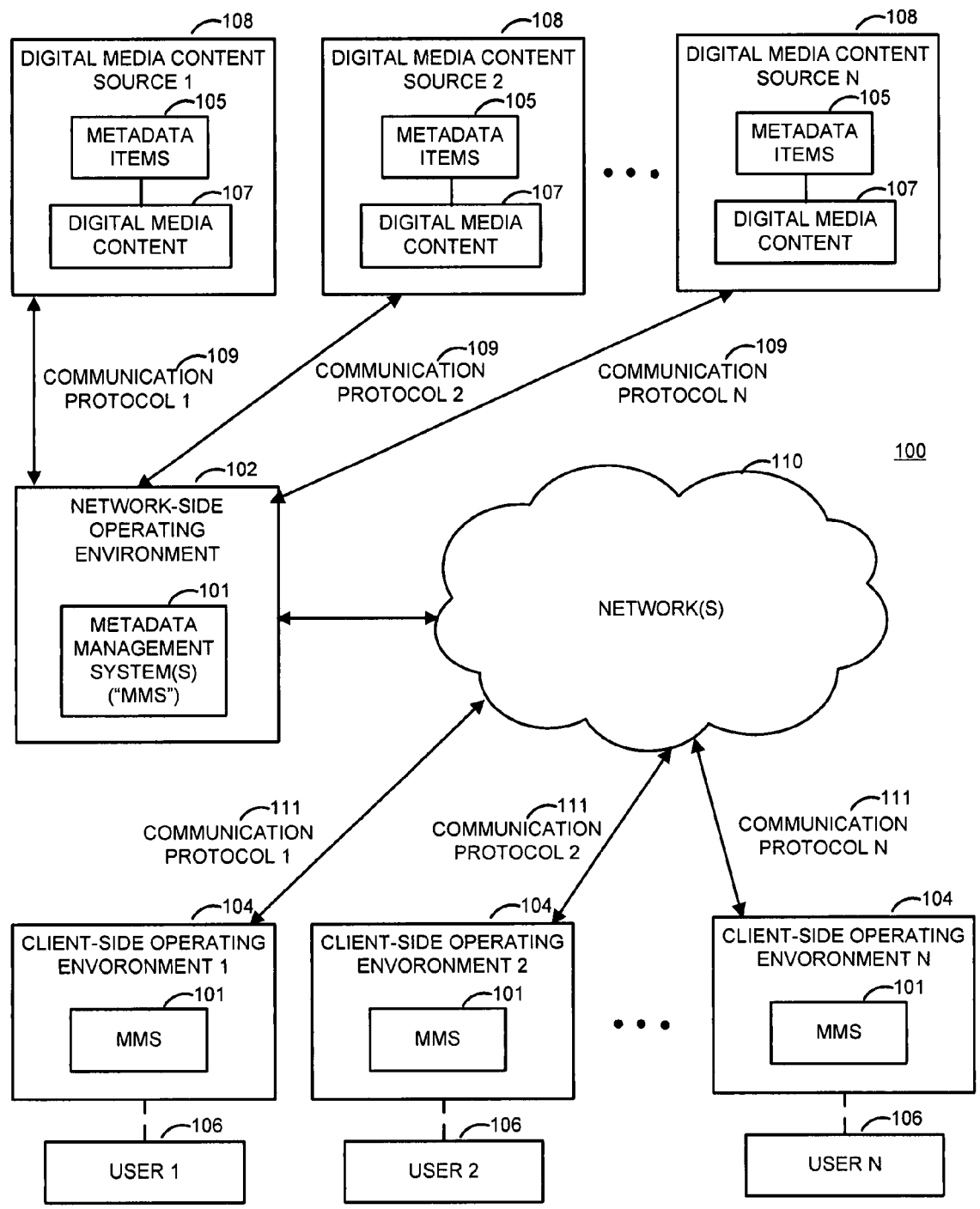
FIG. 1 is a simplified functional block diagram of an architecture via which sets of metadata items associated with digital media content available from numerous sources are collected, transcribed, organized, and presented using aspects of a metadata management system implemented by a client-side and/or a network-side operating environment.

Network-side and client-side operating environments implement systems and techniques for managing metadata items that describe digital media content. On the network side, a metadata management system uses pluggable protocol adapters to communicate with different digital media content sources to collect, transcribe, and organize and update collections of, metadata items describing available digital media content. Transcribing of metadata items is based on a common format.

The common format includes three portions: a first portion, common to all digital media content sources, which is used to store descriptive data (such as text, images, time tags, hyperlinks to related information, and the like) derived from the metadata items collected from each of the digital media content sources using a common schema; a second portion, which is used to store data specific to a particular digital media content source from which the descriptive data stored in the first portion was derived; and an optional third portion, which is a service specifier used for identifying/accessing additional services associated with specific digital media content from the digital media content source indicated in the second portion.

The common schema is used to identify relationships between transcribed items of metadata (rules may also be specified via the common schema to aid it identifying/creating such relationships), and to facilitate the creation of data sets of related metadata and/or digital media content. A single unified catalog of transcribed metadata items may or may not be formed. Data sets (and subsets thereof) are stored in client-side or network-side temporary or permanent memories (for example, cache memories) and provide bases for personal media experiences. Data sets are established based on virtually unlimited metadata selection criteria (predetermined or dynamically determined), such as user information, client-side or server-side operating environment characteristics or capabilities, business rules, temporal references, content-related information, advertising criteria, and the like. The data sets are used to provide personal media experiences to users, via which users can browse and access metadata items and corresponding digital media content in uniform and predictable ways. Alternate embodiments may use data sets to optimize performance for particular network or client device characteristics. In addition, data sets may be used by digital content aggregators to make packaged offerings available to clients. Other methods or uses of datasets where the metadata management system is used as an aggregation point are possible.

Network-side and/or client-side metadata management systems are configured to support the use of various interfaces to accommodate the presentation of metadata items in particular data sets to users of different types of client-side devices. For example, certain interfaces may implement additional metadata transcribing, parsing, compression, caching, encryption, or transforming to facilitate metadata representation in a broad class of client-side devices of varying capabilities.

Turning to the drawings, where like numerals designate like components, FIG. 1 is a simplified block diagram of an architecture 100 that includes a metadata management system ("MMS") 101. MMS 101, which is discussed in further detail in connection with FIG. 2, arranges for the collection, transcription, organization, distribution and presentation of metadata items 105 associated with digital media content 107 that is available for distribution from a particular digital media content source 108 via a particular network 110 and/or communication protocol 109.

Figure 5:
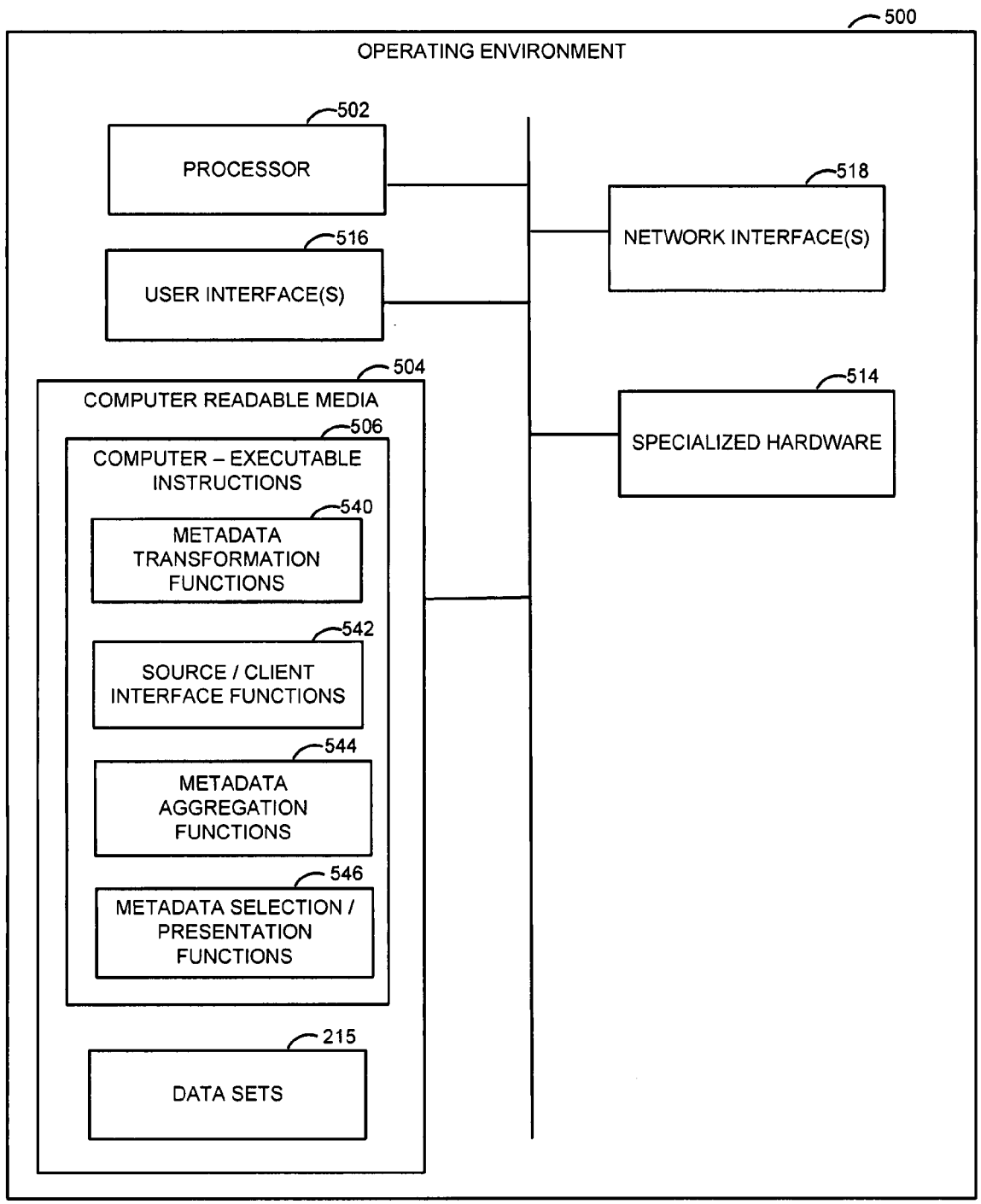
FIG. 5 is a simplified functional block diagram of an exemplary configuration of an operating environment in which the metadata management system shown in FIG. 2 may be implemented or used.

Aspects of MMS 101 may be implemented within one or more network-side operating environments 102 (one shown) within networks 110, such as network-based devices or software applications, and one or more client-side operating environments 104 (1-N client-side operating environments 104, which are responsive to 1-N users 106, respectively, are shown), such as personal electronic devices, fixed purpose networked devices (set top box), or software applications running on general- or special-/fixed-purpose computers. Examples of network-based software applications are Web services hosted by various entities within networks 110 (discussed further below). Examples of client-based software applications include but are not limited to Web browsers and rich clients. Network- and client-side operating environments are also discussed further below, in connection with FIG. 5.

Collectively, networks 110 represent any existing or future, public or private, wired or wireless, wide-area or local-area, packet-switched or circuit-switched, one-way or two-way digital data transmission infrastructures or technologies. Exemplary networks 110 include: the Internet; managed wide area networks (cellular networks, satellite networks, fiber-optic networks, co-axial cable networks, hybrid networks, copper wire networks, and over-the-air broadcasting networks such as television, radio, and datacasting networks are some examples of managed wide area networks); and local area networks (for example, wireless local area networks and personal area networks).

Personal electronic devices include any portable or non-portable electronic devices that are configured to receive metadata items 105 transcribed via MMS 101 and/or digital media content 107, via one or more networks 110/communication protocols or techniques 111. Examples of personal electronic devices include but are not limited to mobile phones, personal digital assistants, personal computers, media players, televisions, set-top boxes, hard-drive storage devices, video cameras, DVD players, cable modems, local media gateways, and devices temporarily or permanently mounted in transportation equipment such as planes, or trains, or wheeled vehicles. Examples of communication protocols or techniques 111 include but are not limited to: peer-to-peer communication tools and techniques; Ethernet; IP; Wireless Fidelity ("WiFi"); Bluetooth; General Packet Radio Service ("GPRS"); Evolution Data Only ("EV-DO"); Data Over Cable Service Interface Specification ("DOCSIS®"); proprietary techniques or protocols; datacasting; High Speed Downlink Packet Access ("HSDPA"); Universal Mobile Telecommunication System ("UMTS"); Enhanced Data rates for Global Evolution ("EDGE"); Digital Video Broadcasting-Handheld ("DVB-H"); and digital audio broadcasting ("DAB").

Metadata items 105 represent any descriptive or identifying information in computer-processable form that is associated with particular digital media content 107 (for example, digital media objects) available for distribution via from a particular digital media content source 108. Examples of metadata items 105 include but are not limited to title information, artist information, program content information (such as starting and ending times and dates for broadcast program content), expiration date information, hyperlinks to websites, file size information, format information, photographs, graphics, descriptive text, and the like.

Digital media objects that are described by metadata items 105 are composed of commercial or non-commercial media samples such as video samples, audio samples, images, graphics, text, multimedia samples, document samples, spreadsheet samples, and data. Examples of commercial digital media objects are broadcast or downloadable video files (such as television programs, movies, and video games), audio files (such as music), image files, graphics files, text files, spreadsheets, documents, multimedia files, and data files such as playlists. Examples of non-commercial digital media objects are photos, music, videos, playlists, documents, spreadsheets, and the like created by users of personal electronic device and uploaded to Web sites or available for peer-to-peer distribution.

Metadata items 105 and digital media objects are generally stored on network-accessible computer-readable media 504 (computer-readable media are discussed in connection with FIG. 5), and may exist any format or protocol or combination thereof, such as various text formats, document formats, spreadsheet formats, portable network graphics ("PNG"), joint photographic experts group ("JPEG"), moving picture experts group ("MPEG"), multiple-image network graphics ("MNG"), hypertext markup language ("HTML"), Adobe Acrobat ("PDF"), extensible HTML ("XHTML"), MP3, WAV, or Microsoft® Windows Media® player formats such as WMA, WMV, or ASF.

Digital media content sources 108 are any wireless or wired electronic devices or systems (or any physical or logical element of such devices or systems), operated by commercial or non-commercial entities, which distribute digital media content 107 and metadata items 105 via one or more networks I 10 (for example, cable networks satellite communication networks, radio frequency networks, and the Internet). Examples of digital media content sources 108 include but are not limited to television programming providers, movie providers, podcasters, music service providers, users of wireless-enabled personal communication devices, and the like. It is common for sources 108 to independently describe and present available digital media content using a variety of catalogs, program guides, and the like that a user learns to navigate independently.

Digital media content sources 108 may use various formats, communication protocols or techniques 109 to provide encoding and/or transport for metadata items 105 and digital media content 107 via networks 110. It will be appreciated that metadata items 105 and digital media content 107 may be distributed independently (for example, a data clearinghouse may distribute metadata items from a number of services, while digital media objects may come from multiple other sources). Often, such formats, communication protocols, or techniques are proprietary or source-specific. Examples of some higher-level protocols or techniques 109 include but are not limited to: Internet protocols; mobile data transmission protocols; cable transmission protocols; over-the-air broadcasting protocols; and satellite transmission protocols.

It is not uncommon for users 106 to obtain digital media content from multiple sources. Sometimes the same digital media content is provided by different sources, or by the same source over different networks. Sources have not collaboratively adopted a single standard for providing media services or metadata to users—the manner of delivery, as well as the structure and formatting, of both digital media content and metadata are generally incompatible between sources.

Accordingly, it is desirable to use MMS 101 to collect and manage metadata items 105 that describe digital media content 107 available from a variety of sources 108, and to represent, organize and recognize/add associations between such metadata in a manner that allows people using a wide variety of client-side operating environments 104 to uniformly discover, select and access relevant metadata and associated digital media content.

Figure 2:
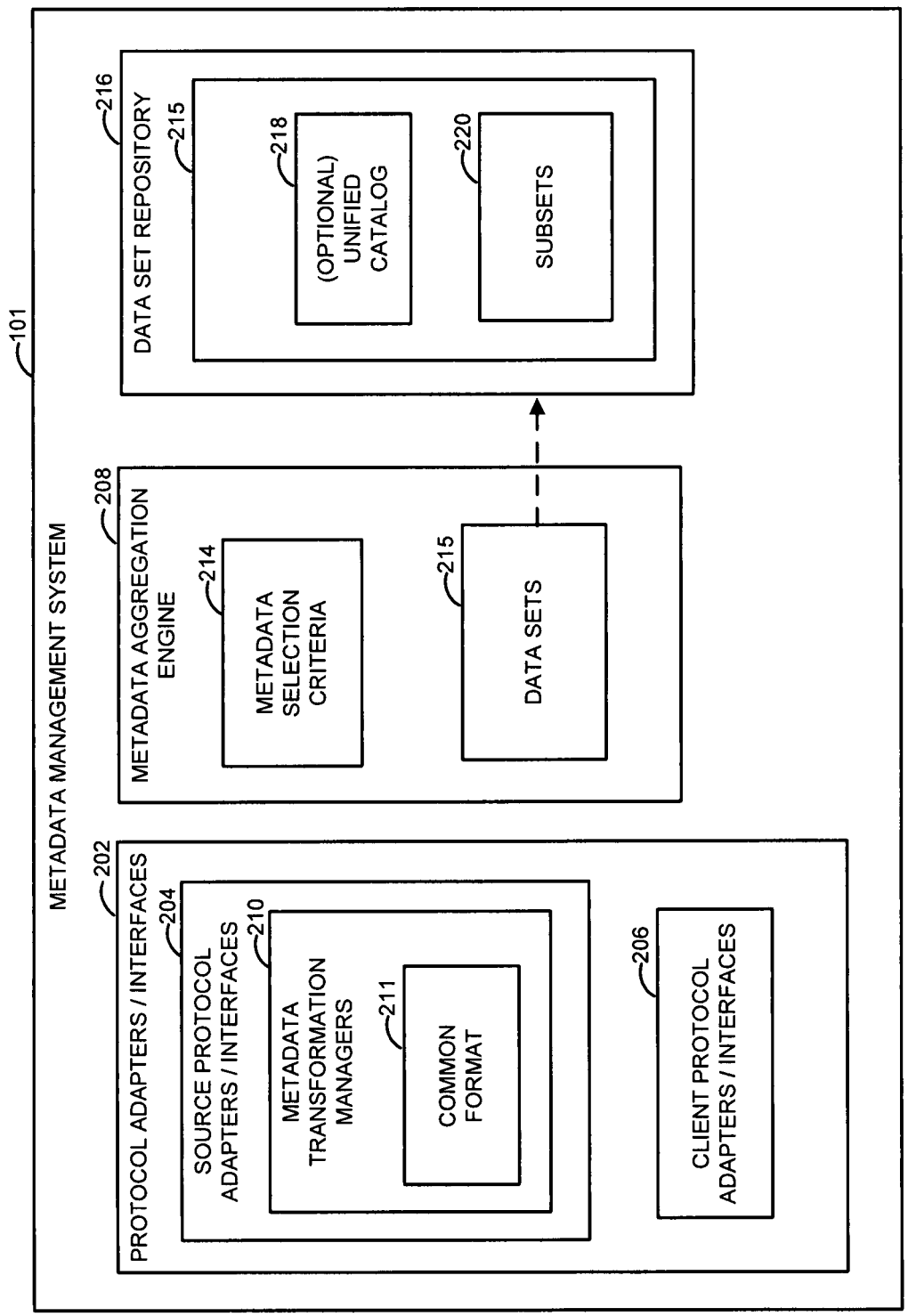
FIG. 2 is a simplified functional block diagram of the metadata management system shown in FIG. 1.

With continuing reference to FIG. 1, FIG. 2 is a simplified functional block diagram of MMS 101, which is generally responsible for arranging for the collection of metadata items 105 having disparate sources and formats, transcribing the collected metadata items using a common schema, using the common schema to leverage associations between the transcribed metadata items in various ways to provide personal media experiences to users 106, and creating/detecting new associations between collected metadata items. It will be appreciated that a wide variety of features, functions, and experiences may be created using aspects of the systems and techniques described herein.

As shown, MMS 101 includes: protocol adapters/interfaces 202, which further include source protocol adapters/interfaces 204 (having metadata transformation managers 210 utilizing a common format 211) and client protocol adapters/interfaces 206; a metadata aggregation engine 208, which utilizes metadata selection criteria 214 for creating data sets 215; and temporary or permanent data set repository (ies) 216, for storing data sets 215, including an optional unified catalog 218 and subsets 220. Alternate embodiments of MMS 101 may include digital content transformation managers in addition to metadata transformation managers to enable distribution of digital media content using a common set of formats and protocols.

In general, design choices and/or operating environments dictate how and whether specific functions of MMS 101 are implemented. Such functions may be implemented using hardware, software, firmware, or combinations thereof.

Source protocol adapters/interfaces 204 define the way in which MMS 101 implemented in network-side environment 102 communicates with a particular digital media content source 108 to collect metadata items 105 associated with digital media content 107 available from the particular media content source. In one possible implementation, multiple, pluggable protocol adapters are defined. Each adapter is configured to connect to a specific digital media content source 108 using a predetermined protocol for the purpose of collecting metadata items 105 therefrom. Such communication may be initiated by MMS 101 or a particular source, and data push or pull techniques may be employed. In an alternate embodiment a specific protocol adapter is defined that is generally supported by all digital media content sources 108 to collect metadata items 105. While advantageous from a simplicity perspective, the single protocol model does not account for the large variation of protocols available today.

Metadata transformation managers 210 use information about the format(s) of metadata items 105 received from a particular source to parse the format(s), and to transcribe the metadata items in accordance with common format 211 (common format 211 is discussed in detail in connection with FIG. 3), generating transcribed metadata items 205. Transformation managers 210 are generally, but not necessarily, tightly bound to the source protocols adapters/interfaces 204 in such a way that metadata may be retrieved from digital media content sources 108 using source specific methods. Additional rules may exist in transformation managers 210 to synthesize metadata items 105 according to the common schema from one or more custom metadata items available from digital media content sources 108. In one scenario, data obtained from original metadata items 105 may be inserted into a field of the common schema. In another scenario, additional computer-usable information may be generated based on data obtained from the original metadata items 105 and specified via the common schema. In one example, transformation managers 210 may generate additional tags and/or rules that aid in determining how metadata items are related, and create new associations between metadata items (for example, different metadata may be used to describe the same digital media content, and rules ensure that the relationship between the disparate metadata items is identified). In another example, intelligent matching (and rules therefor) may be performed based on information/knowledge obtained from operation of MMS 101. Source protocol adapters/interfaces 204 may pre-collect metadata items 105 and store transcribed metadata items 205 (using aspects of data set repository 216, for example), or may collect and transcribe metadata "on the fly."

Client protocol adapters/interfaces 206 define the way in which MMS 101 (implemented in a network-side operating environment 102 or client-side operating environment 104) communicates with a particular client-side operating environment and/or user 106. Client protocol adapters/interfaces 206, for example, may attach to common format 211 (discussed further below, in connection with FIG. 3) and expose different interfaces having presentation tools, controls, and connectivity features that define the way operating environments or users interact with or receive data from MMS 101.

Different client protocol adapters/interfaces 206 may be defined for different purposes. For example, interfaces 206 may be provided for use with personal electronic devices having various data communication capabilities to enable discovery, enumeration and connection to MMS 101 in network-side operating environment 102. For devices that are not capable of complex data communication or storage, such as disc-less devices, data transmission and receipt may be handled using data chunks of relatively small size, such as 64 Kb, via well-defined protocols such as HTTP and RTSP. For devices with richer capabilities, protocols such as Simple Object Access Protocols ("SOAP") or REST protocols may be employed using principles of Web service architectures. Other protocols, public or proprietary, may also be used. Interfaces 206 can also implement additional metadata transformation, parsing, compressing, caching, encryption or formatting to facilitate metadata presentation in a broad class of client devices of varying capabilities. Interfaces 206 may also receive and evaluate user-input information for various purposes, such as to ascertain metadata selection criteria 214 (discussed further below, in connection with metadata aggregation engine 208), or to request access to digital media content 107 associated with transcribed metadata items 205. Still further, interfaces 206 facilitate presentation of search results 106 to users. Generally, client protocol adapters/interfaces 206 would benefit from specific, well-defined protocols to be used by MMS 101 and/or proxy servers with which devices will communicate, rather than supporting the broad range of protocols/interfaces already in use today. By placing such a feature on client-side operating environments 104, a wider range or varying types and configurations of devices may be supported.

Metadata aggregation engine 208 utilizes various metadata selection criteria 214 for leveraging associations between transcribed metadata items 205 to establish and provide access to data sets 215. Data sets 215 are groups of transcribed metadata 205. Data sets 215 may be pre-formed or formed "on the fly." Data sets 215 are stored in data set repository(ies) 216 (discussed further below). One type of data set 215 is a subset 220 of transcribed metadata items 205. Subsets 220 of transcribed data items 205 include transcribed data items that meet one or more metadata selection criteria 214. Another type of data set 215 is a unified catalog 218, which includes substantially all transcribed metadata items 205. Aspects of metadata aggregation engine 208 may be hosted within or on the edge of one or more networks 110 or client-side operating environments.

Data sets 215 are generally searchable using standard search algorithms, based on user-input or automatic queries derived from metadata selection criteria 214. Because subsets 220 generally have considerably less data than unified catalog 218, and because searchable information is organized/correlated in accordance with common format 211, efficient, accurate searching and data caching are possible. Because architecture 100 is flexible, various functions (such as searching data sets 215 and presenting search results) can be performed using network-side processing, client-side processing, or a combination thereof. For example, a Web server may provide access to data sets 215 via normal Web-based protocols such as HTTP and XML, or a rich client can perform complex searches and presentation of data sets 215 using SQL queries or supported Web Services.

The associations formed by metadata aggregation engine 208 between transcribed metadata items 205 to create data sets 215 may be internal (that is, based on information related to the common format 211 or transcribed metadata items 205) or external. Metadata items 105 may be pre-collected and organized data sets 215 based on predetermined metadata selection criteria 214, or metadata items 105 may be collected and organized "on the fly" based on metadata selection criteria 214 input provided by specific users 106.

Virtually unlimited metadata selection criteria 214 and combinations thereof are possible. Metadata selection criteria 214 may be received from users 106, pre-programmed into MMS 101 in any operating environment, or received from third parties (such as digital media content sources and/or protocols adapters). Metadata selection criteria 214 may be predetermined or may be dynamically created. Metadata selection criteria 214 may also include expressions involving logical references to variables. Boolean operands such as "AND," "OR," and "NOT", along with other operands or types thereof, may be used to define such expressions. Inferences can also be made by inspecting individual metadata items to create "intelligent" selection criteria. Generally, metadata selection criteria 214 are used in an automatic way, instead of being programmed via human-directed programming, although "human programmed" subsets are also possible.

Metadata selection criteria 214 provide the ability to create common, popular data sets based on device capabilities, which provide for efficient data storage and faster data access. Dynamic data sets based on popularity indicators can also improve access time. Certain "guide-centric" data sets enable access to data that bridges multiple sources (for example, information about Web-based content may be mixed with information about cable television programming, and users can pick and choose between the two types of information/content). Some specific types of metadata selection criteria 214 include but are not limited to: information about users (such as user preferences, age, gender, geographic location, information collected based on previous activities of the user with respect to MMS 101 or other services, electronic affiliations with other people or services as determined by user communities, buddy lists or service subscriptions); client-side operating environment characteristics or capabilities; business rules (such as rules specifying when metadata items 105 should be collected from sources 108 or when metadata items 105 expire, or bundling rules provided by sources 108 or other service providers such as advertisers); temporal references (such as times, dates, or time zone data); content-related information (such as media type, parental control ratings, presentation formats or quality, price/promotions, genre, source, titles, artists, release dates, times, and the like); and advertising criteria.

Some examples of data sets 215 that may be formed via use of metadata selection criteria 214 include but are not limited to: a "net gen viewing guide" targeting young audiences with digital media content from certain sources popular to such audiences; user-specific data sets such as sports-specific data sets; high definition content guides, sortable by availability times and prices; broadcast television content available for Internet download from various sources; digital media content that received favorable user comments on blogs or Web sites soliciting user opinions; user-preferred broadcast content not already viewed by a particular user; top news stories in a particular week or other timeframe; additional information available from third parties (such as advertisers or other content providers such as movie theaters, talk shows, etc.) that relates to certain digital media content (such as movies, actors, etc.); and broadcast content available from an alternative source (such as an on-demand service). A further example of another type of data set 215 is a data set of transcribed metadata 205 associated with a particular electronic device or type thereof (such as a product or a part/ aspect of a product like a phone or a video card). In this case, the sources of the original metadata items are virtually unlimited—sources may include the particular device or device manufacturer, suppliers of products that interoperate with or on the device, third party Web sites, consumers, and the like. The original metadata items are collected and aggregated in accordance with the common schema, and the data set of transcribed metadata describes the electronic device. Any desired aspects of the device may be described, such as functional characteristics, photos, links to user manuals, and the like.

Data set repository(ies) 216 are used to store data sets 215. Data set repository(ies) 216 are implemented using various types and arrangements of permanent or temporary computer-readable media 504 (computer-readable media are discussed in connection with FIG. 5). In one possible implementation, data sets 215 are stored in databases associated with MMS 101. In another possible implementation, data sets 215 are stored in third party databases that implement common format 211. Caching algorithms can play a valuable role to efficiently maintain data sets 215 or portions thereof that change frequently or are established on the fly.

Figure 3:
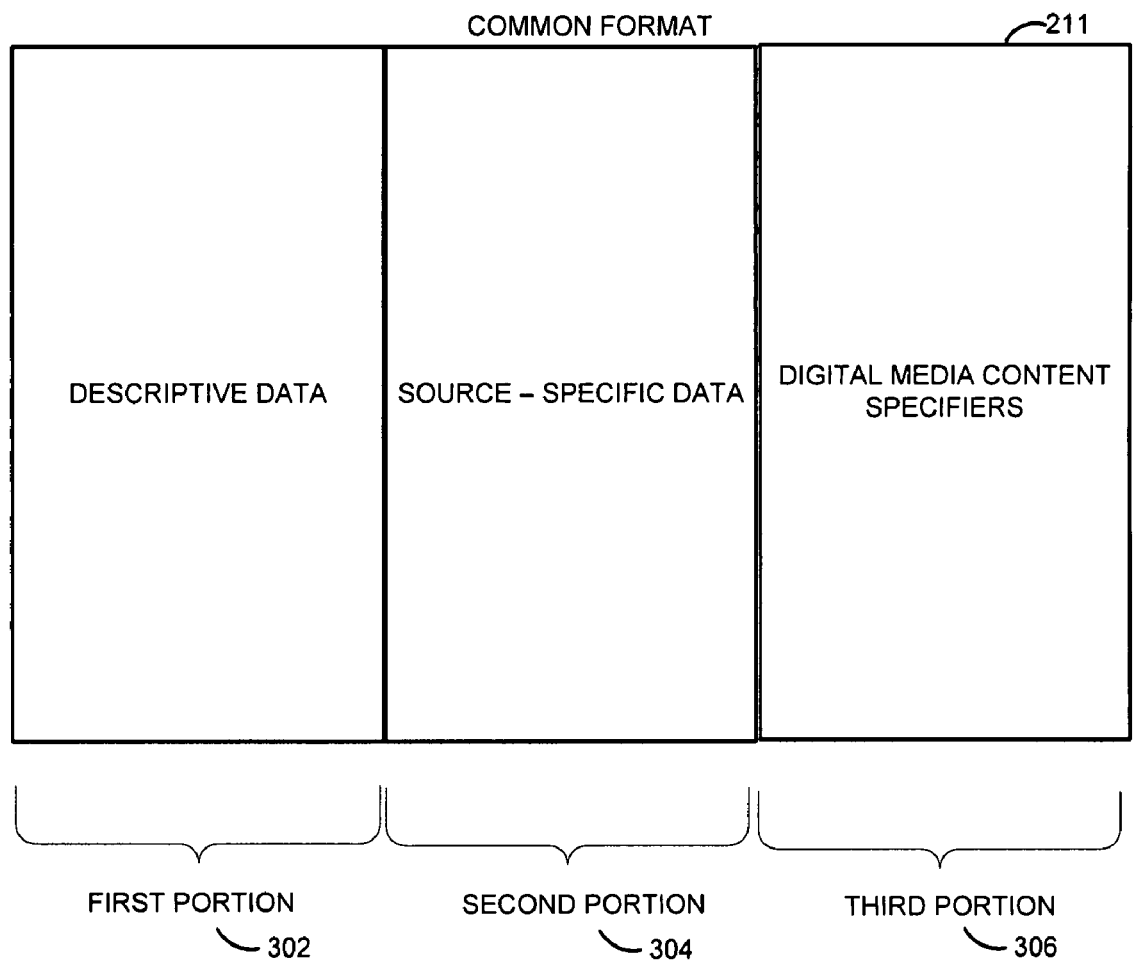
FIG. 3 illustrates portions of an exemplary common format usable in connection with the metadata management system shown in FIG. 2.

With continuing reference to FIGS. 1 and 2, FIG. 3 illustrates an exemplary common format 211 usable in connection with metadata management system 101 to facilitate the computerized collection, cataloging, searching, and presentation of relevant metadata and associated digital media content. Common format 211 may be implemented using any appropriate encoding technique such as XML.

As shown, common format 211 is an envelope format that includes three portions 302, 304, and 306. First portion 302 is a "public" portion, available to all users and common to metadata items 105 received from every digital media content source 108. First portion 302 is used to store descriptive data (such as text, images, time tags, hyperlinks to related information and the like) about particular digital media content 107 that is derived from original metadata items 105 or generated by MMS 101. First portion 302 also generally provides information, such as tokenized Uniform Resource Locators, usable to contact specific digital media content sources 108 providing digital media objects 107 that are described by the data in first portion 302 for the purpose of presentation. As such, first portion 302 serves as a "superset" of original metadata items 105 transcribed from all sources 108. As new sources 108 authorize collection of metadata items 105 by MMS 101, first portion 302 may be modified to add elements for descriptive data specific to digital media content 107 provided by different digital media content sources 108. First portion 302 may also be modified (manually or automatically) to add elements for descriptive data used to improve information retrieval. The information represented in first portion 302 is generally encoded using a common schema for representing metadata. Exemplary schemas include Digital Item Declaration Language ("DIDL") or the World Wide Web Consortium ("W3C") specifications for Resource Description Framework ("RDF"). Embodiments of first portion 302 would provide enough information to enable client-side operating environments to provide a rich discovery and browse scenario of digital media content from a variety of digital media content sources without requiring specific knowledge of the specific protocols necessary for communicating with the different metadata sources. Additional client-side operating environments have the ability to present the content from the source using the provided Uniform Resource Locator to the user.

Second portion 304 is an optional "private" portion used to store data in a format specific to one or more digital media content sources 108 from which original metadata items 105 were obtained and/or from which digital media content 107 associated with descriptive data in first portion 302 may be obtained. Information available in second portion 304 is assumed to be represented in a computer readable format using some accepted method of data tagging which includes at a minimum an identifier for the type of data represented and the data itself. Data stored in second portion 304 may be packed or encrypted in such a manner that it is selectively available only according to licensing or specifications that define the format of the data. Alternatively the data provided in second portion 304 may be easily usable by any application, for example encoded using a well-known XML schema that the application may parse without any additional requirements, or the application may be required to interact with the optional service description found in third portion 306 to utilize the private data or to receive services based on its contents.

Optional third portion 306 contains one or more service descriptions, in the form of a Uniform Resource Identifier to a Web Service Definition Language (WSDL) for a digital media content source web service. The functionality of the web service is generally under the control of digital media content source 108. One usage of third portion 306 is to enable access to digital media objects 107 in cases where first portion 302 does not specify a URL. Using this model for distribution of digital media objects 107, operators in proprietary environments, such as cable or satellite providers, may be able to publish content to MMS 101 and still restrict access to the content. Alternate digital media sources 108 may use the web service specified in third portion 306 as a way to create "value added" experiences with clients that have the ability to interact directly with the digital media content sources via the Web Service specified in third portion 306. The inclusion of a web service reference via MMS 101 provides the flexibility to add differentiated experiences by enabling client-side users of content within MMS 101 to interact directly with digital media content sources for richer experiences. It will be appreciated that the information carried in first portion 302 or second portion 304 may be required by the service defined in third portion 306 in order to identify the digital media content 107 in question and use the services offered. It will also be appreciated that since both the data in second portion 304 and the service described using third portion 306 are provided by digital media content source 108 that the format and contents of second portion 304 may be proprietary to digital media content source 108 and may require additional client-side operating environments to meet certain requirements, such as an appropriate security context, before the service and data may be made available.

Using flexible, extensible MMS 101 and common format 211, it is possible to ensure the consistent associations between metadata and digital media content originating from many sources of digital media content, and to enable efficient yet complex computerized discovery of relevant metadata/ digital media content by a wide variety of network-side and client-side operating environments. Accordingly, a wide variety of personal digital media experiences based on disparate metadata items collected from various sources can be ubiquitously provided to users of many types of personal electronic devices. As indicated it is also possible to allow digital media content source(s) 108 to create rich, service specific scenarios with applications running on client-side operating environments 104 and still provide a common media discovery and access model using MMS 101.

With continuing reference to FIGS. 1-3, FIG. 4 is a flowchart illustrating certain aspects of a method for managing metadata, such as metadata items 105 and 205, using a metadata management system such as MMS 101. The method(s) illustrated in FIG. 4 may be implemented using computer-executable instructions executed by one or more general, multi-purpose, or single-purpose processors (exemplary computer-executable instructions 506 and processor 502 are discussed further below, in connection with FIG. 5). Unless specifically stated, the methods described herein are not constrained to a particular order or sequence. In addition, some of the described method or elements thereof can occur or be performed concurrently. It will be understood that all of the steps shown need not occur in performance of the functions described herein.

For exemplary purposes, it is assumed that a particular user 106 of a personal electronic device (referred to as George for discussion purposes) desires to use MMS 101 to search for and browse metadata relating to digital media objects 107 available from multiple digital media content sources 108. It is further assumed that George is using his personal computer ("PC"), which has Internet access, to identify content related to a favorite television program. Because architecture 100 is flexible, various functions discussed in connection with FIG. 4 can be performed using network-side processing, client-side processing, or a combination thereof.

The method begins at block 400, and continues at block 402, where sources 108 of digital media content 107 are identified. Examples of digital media content sources 108 include but are not limited to providers of broadcast or downloadable content, such as providers of television programming, movies, podcasts, music, and the like, which provide such content via one or more networks 110 and communication protocols or techniques 109. Sources 108 of digital media content 107 may be pre-identified or identified "on the fly" by MMS 101. For example, in the case where MMS 101 is searching for relevant metadata/digital media content in response to a user request, such as a query/request for information about digital media content relating to the television program that is made on behalf of George, certain specific sources 108 that provide broadcast television programs may be identified or contacted in response to the user request. Additionally MMS 101 may be designed to cause sources 108 that provide downloadable content to also be searched. Other embodiments of MMS 101 may select content from existing data sets 215 rather than directly contacting digital media content sources 108. For example, if George had requested only related content available in high definition (HD), an existing data set 215 of HD content may be examined instead of contacting sources 108 directly.

Next, at block 404, sets of metadata items 105 associated with digital media content 107 available from the sources identified at block 402 are identified. For example, time-or non-time-based metadata items such as digital content catalogs, program guides, and the like, may be identified. Generally, sets of metadata items 105 from different sources have different formats and/or are retrieved via different communication protocols or techniques 109. In the context of MMS 101, pluggable source protocol adapters/interfaces 204 may be configured to communicate with different digital media content sources 108, including but not limited to cable, satellite, or over-the-air television program providers, Internet-based media service providers, peer devices in a local hotspot or personal area network, and the like, using appropriate communication protocols or techniques 109. In one scenario, pluggable source protocol adapters/interfaces 204 may be configured to retrieve (for example, subscribe to) all or specific subsets of available metadata items 105 (or updates thereto) from particular sources on a periodic basis. In another scenario, sets of metadata items 105 (or updates thereto) from sources 108 may be identified "on the fly" in response to a user request, such as the request received from George, who is seeking digital media content related to his favorite television show.

Sets of metadata items 105 collected at block 404 are transcribed in accordance with a common schema, as indicated at block 406. In the context of MMS 101, original metadata items 105 are parsed and transcribed by metadata transformation managers 210 into transcribed data items 205, in accordance with common format 211. All or only some items in a set of collected metadata items may be transcribed and stored as data sets 215, permanently or temporarily, in one or more data set repositories 216 (data sets 215 and data set repositories 216 are discussed further below). For example, if metadata items 105 are collected "on the fly", it may be desirable to only transcribe and store relevant metadata items—in response to George's request, those relating to the television program. Transcription may also involve the MMS 101 adding certain useful computer-usable descriptors or links to databases/catalogs at other network processing locations, which can facilitate the identification of relationships between transcribed metadata items.

At block 408, the common schema is used to identify relationships between transcribed metadata, and based on the identified relationships, data sets are updated or formed at block 410. In the context of MMS 101, metadata aggregation engine 208 generally identifies relationships between transcribed metadata items 205 and forms data sets 215. Identification of such relationships generally involves evaluating relationships between user-input information and transcribed metadata items 205 (that is, data stored within first, second or third portions 302, 304, or 306, respectively, of the common format in accordance with which the original metadata items were transcribed), or between various fields of transcribed metadata items 205 themselves. In both cases, metadata selection criteria 214 may be used in the identification of relationships between transcribed metadata items 205. Relationships between transcribed metadata items 205 may be pre-established or established on the fly. For example, subsets 220 of transcribed metadata items 205 that meet certain metadata selection criteria 214 may be pre-established and periodically updated, or subsets 220 of transcribed metadata items 205 may be established in response to user input. It will also be appreciated that it is possible to form a data set (referred to as unified catalog 218) of all transcribed data items 205.

In the exemplary scenario of George's search for digital media content 107 relating to the television program, a subset 220 of transcribed metadata items 205 (from various sources 108) that relate to the television program is identified. Generally, each transcribed metadata item in the subset has descriptive data in its first portion 302 that relates to the television program. For example, transcribed metadata items associated with digital media content related to the television program such as program guides, songs, or links to Web sites that describe or make available the television program or actors therein, video clips, or audio clips are identified as related to the television program and included in the subset. The subset of metadata items that relate to the television program may have been formed prior to the query on behalf of George, or formed in response to the query. MMS 101 may have already been working on George's behalf to provide content that George wants quickly, rather than requiring him to browse through all of the potential results to find something that is renderable on George's PC. The subset may be permanently or temporarily stored in one or more data set repositories 216 located within one or more networks 110 (for example, on a Web server) or on George's PC. The set may also include contents from other sets, such as those that meet the presentation capabilities of George's personal computer rather than linking directly to data from the original digital media content source. Alternatively MMS 101 may identify that the results to George's request includes media in HD formats and update a dataset 215 of HD content to include the new items.

The data set(s) formed at block 410 are used to provide personal media experiences to users, as indicated at block 412. In the context of MMS 101, information stored via common format 211 and associated with relevant data sets is identified by metadata aggregation engine 208 and presented to a user of a personal electronic device via client protocol adapters/interfaces 206. Client protocol adapters/interfaces 206 are generally configurable to provide certain information to, or obtain certain information from, MMS 110 in accordance with common format 211, to allow users to access relevant transcribed metadata items 205 and/or associated digital media content 107. For example, information within first portion 302 of common format may be presented to users 106, via user interfaces, in a manner that allows the users to browse metadata items relating to digital media objects in a uniform and predictable manner. When users indicate a desire to receive particular digital media objects, the tokenized Uniform Resource Locators included within first portions 302 of common format 211 are usable to contact specific digital media content sources 108 to obtain the digital media objects identified. If users are subscribers to services (or agree to become subscribers to services) offered by particular digital media content sources 108, the users may be granted access to data stored in second portion 304 of common format 211 and authorized to receive such services via various client-side operating environments 104 via the service defined in the third portion 306 of common format 211. Alternatively no digital media objects 107 may be provided via tokenized Uniform Resource Locators and users may be required to use the service defined in third portion 301

In the example of the subset of transcribed metadata items relating to the television program, the metadata items, along with references to the digital media objects associated therewith, are presented to George via a user interface that allows George to browse to metadata items and/or digital media object descriptions, and to select specific digital media objects for consumption based on a variety of criteria, such as availability time, format quality, source, and cost. A Web server may provide access to certain data sets 215 via normal Web-based protocols such as HTTP or RTSP, or a rich client can perform complex searches and presentation of data sets 215. Client protocol adapters/interfaces 206 implemented within the network-side or client-side operating environment may attach to common format 211 and expose different interfaces having presentation tools, controls, and connectivity features that define the way George interacts with or receive data from MMS 101.

In this manner, it is possible to leverage the consistent associations between disparate metadata items describing digital media content available from various sources. People using a wide variety of personal electronic devices are able to discover and access relevant metadata and digital media content, even when the digital media content is not available from a single source. The flexible architecture of MMS 101 accommodates processing and caching within or on the edge of various networks, and enabling efficient yet complex searching and data storage models that accommodate frequently changing data.

Figure 4:
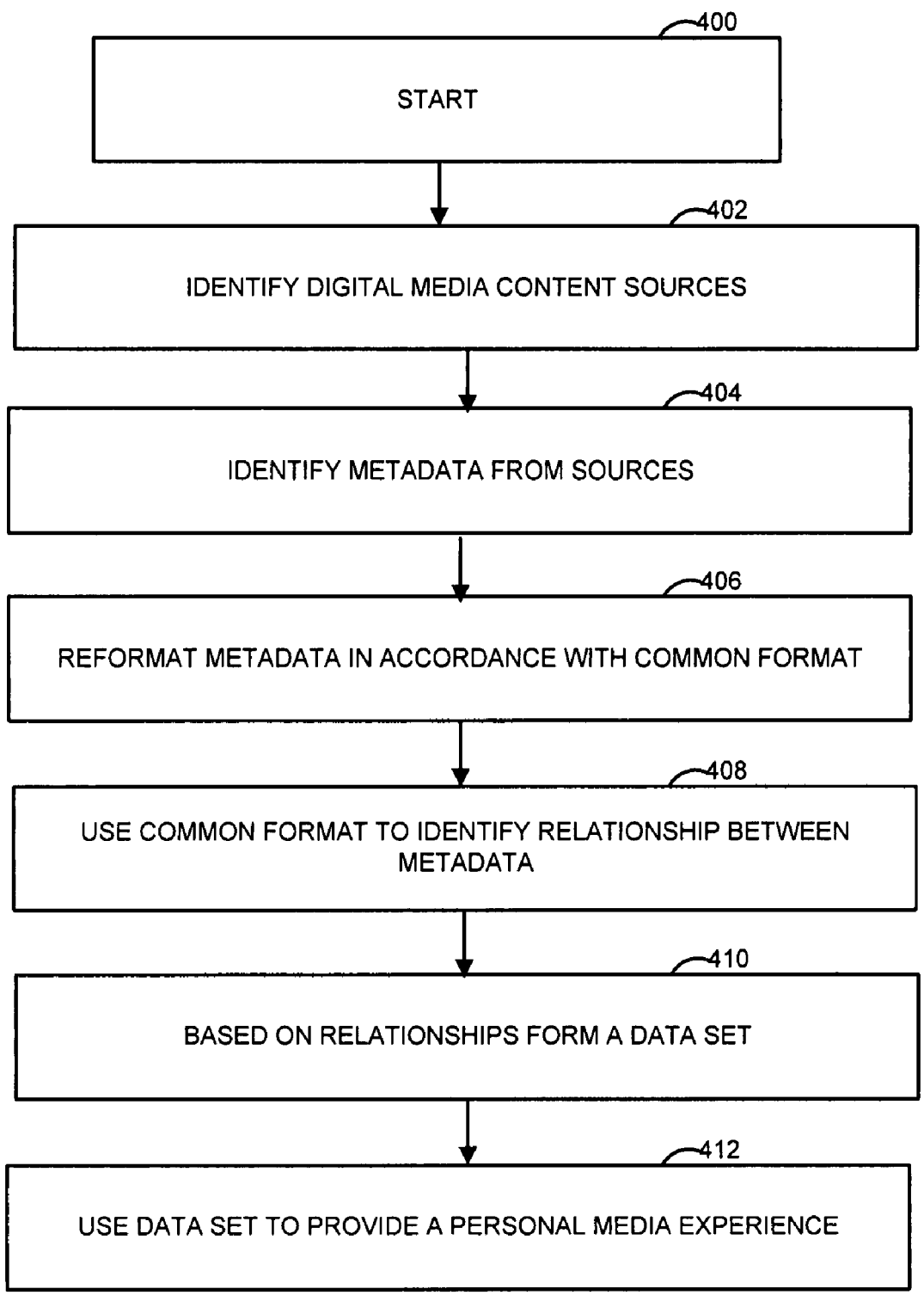
FIG. 4 is a flowchart illustrating certain aspects of a method performed by aspects of the metadata management system shown in FIG. 2.

With continued reference to FIGS. 1-4, FIG. 5 is a block diagram of an exemplary configuration of an operating environment 500 (such as a client-side operating environment or a network-side operating environment) in which all or part of MMS 101, and/or the method(s) shown and discussed in connection with FIG. 4 may be implemented or used. Operating environment 500 is generally indicative of a wide variety of general-purpose or special-purpose computing environments, and is not intended to suggest any limitation as to the scope of use or functionality of the system(s) and methods described herein. For example, operating environment 500 may be a type of portable or non-portable device such as a personal media rendering device, a personal computer, a phone, a digital camera, a server, a digital video recorder, an in-vehicle device, or a personal digital assistant.

As shown, operating environment 500 includes processor 502, computer-readable media 504, user interfaces 516, network interfaces 518, and specialized hardware 514. Computer-executable instructions 506 are stored on computer-readable media 504, as are data sets 215. One or more internal buses may be used to carry data, addresses, control signals and other information within, to, or from operating environment 500 or elements thereof.

Processor 502, which may be a real or a virtual processor, controls functions of operating environment 500 by executing computer-executable instructions 506. Processor 502 may execute instructions 506 at the assembly, compiled, or machine-level to perform a particular process.

Computer-readable media 504 represent any number and combination of local or remote devices, in any form, now known or later developed, capable of recording or storing computer-readable data, such as computer-executable instructions 506 or data sets 215. In particular, computer-readable media 504 may be, or may include, a semiconductor memory (such as a read only memory ("ROM"), any type of programmable ROM ("PROM"), a random access memory ("RAM"), or a flash memory, for example); a magnetic storage device (such as a floppy disk drive, a hard disk drive, a magnetic drum, a magnetic tape, or a magneto-optical disk); an optical storage device (such as any type of compact disk or digital versatile disk); a bubble memory; a cache memory; a core memory; a holographic memory; a memory stick; or any combination thereof.

Computer-executable instructions 506 represent any signal processing methods or stored instructions. Generally, computer-executable instructions 506 are implemented as software components according to well-known practices for component-based software development, and encoded in computer-readable media (such as computer-readable media 504). Computer programs may be combined or distributed in various ways. Computer-executable instructions 506, however, are not limited to implementation by any specific embodiments of computer programs, and in other instances may be implemented by, or executed in, hardware, software, firmware, or any combination thereof.

As shown, certain computer-executable instructions 506 implement metadata transformation functions 540, which implement aspects of metadata transformation managers 210; certain computer-executable instructions 506 implement source/client interface functions 542, which implement aspects of protocol adapters/interfaces 202; certain computer-executable instructions 506 implement metadata aggregation functions 544, which implement aspects of metadata aggregation engine 208; and certain computer-executable instructions 506 implement metadata selection/presentation functions 546, which also implement aspects of metadata aggregation engine 208 and/or protocol adapters/interfaces 202.

User interface(s) 516 are physical or logical elements that define the way a user interacts with a particular application or device, such as client-side operating environment 500. Generally, presentation tools are used to receive input from, or provide output to, a user. An example of a physical presentation tool is a display such as a monitor device. An example of a logical presentation tool is a data organization technique (such as a window, a menu, or a layout thereof). Controls facilitate the receipt of input from a user. An example of a physical control is an input device such as a remote control, a display, a mouse, a pen, a stylus, a microphone, a keyboard, a trackball, or a scanning device. An example of a logical control is a data organization technique via which a user may issue commands. It will be appreciated that the same physical device or logical construct may function as an interface for both inputs to, and outputs from, a user.

Network interface(s) 518 are one or more physical or logical elements that enable communication by operating environment 500 via one or more protocols or techniques usable in connection with networks 110.

Specialized hardware 514 represents any hardware or firmware that implements functions of operating environment 500. Examples of specialized communication hardware include encoder/decoders ("CODECs"), decrypters, application-specific integrated circuits, secure clocks, and the like.

It will be appreciated that particular configurations of operating environment 500 or MMS 101 may include fewer, more, or different components or functions than those described. In addition, functional components of operating environment 500 or MMS 101 may be implemented by one or more devices, which are co-located or remotely located, in a variety of ways.

Although the subject matter herein has been described in language specific to structural features and/or methodological acts, it is also to be understood that the subject matter defined in the claims is not necessarily limited to the specific features or acts described above. Rather, the specific features and acts described above are disclosed as example forms of implementing the claims.

It will further be understood that when one element is indicated as being responsive to another element, the elements may be directly or indirectly coupled. Connections depicted herein may be logical or physical in practice to achieve a coupling or communicative interface between elements. Connections may be implemented, among other ways, as inter-process communications among software processes, or inter-machine communications among networked computers.

The word "exemplary" is used herein to mean serving as an example, instance, or illustration. Any implementation or aspect thereof described herein as "exemplary" is not necessarily to be constructed as preferred or advantageous over other implementations or aspects thereof.

As it is understood that embodiments other than the specific embodiments described above may be devised without departing from the spirit and scope of the appended claims, it is intended that the scope of the subject matter herein will be governed by the following claims.

What is claimed is:

1. A computer-readable storage medium, that is not a propagating signal, encoded with computer-executable instructions which, when executed by a processor, perform a method for managing metadata associated with digital media content, the method comprising:

identifying a first digital media content source and a second digital media content source;

identifying a first protocol usable for communication with the first digital media content source and a second protocol usable for communication with the second digital media content source;

using a first pluggable protocol adapter to establish a first communication session with the first digital media content source via the first protocol, to identify a first set of metadata items associated with digital media content distributable via the first digital media content source, the metadata items within the first set of metadata having a first format;

receiving the first set of metadata items via the first communication session;

using a second pluggable protocol adapter to establish a second communication session with the second digital media content source via the second protocol, to identify a second set of metadata items associated with digital media content distributable via the second digital media content source, the metadata items within the second set of metadata items having a second format different from the first format;

receiving the second set of metadata items via the second communication session;

transcribing the metadata items within the first set of metadata items and the second set of metadata items in accordance with a common format serving as a universal medium for exchange of information about digital media content from different digital media content sources, the common format comprising an envelope format specifying a first portion, a second portion, and a third portion, the first portion to store descriptive data associated with a particular digital media object and information usable to contact the particular source, said descriptive data being derived from one or more metadata items obtained from a particular digital media content source and encoded in a manner as to be available to a plurality of clients, the second portion to store data in a format specific to one or more digital media content sources that provided the metadata items from which the descriptive data stored in the first portion was derived, and the third portion to identify web services offered on behalf of the one or more digital media content sources that provided the metadata items from which the descriptive data stored in the first portion was derived, the web services usable to obtain additional functionality associated with the particular digital media object;

based on filter criteria applied to the descriptive data stored in accordance with the first portion of the common format, identifying a relationship between at least one transcribed metadata item originating from the first set of metadata items and at least one transcribed metadata item originating from the second set of metadata items;

based on the identified relationship, including the at least one transcribed metadata item originating from the second set of metadata items in a data set; and providing access to the data set to a client-side electronic device, to provide a personal media experience to a user.

2. The computer-readable storage medium according to claim 1, wherein the first digital media content source and the second digital media content source comprise network-side or client-side media distribution services.

3. The computer-readable storage medium according to claim 1, wherein the digital media content distributable via the first digital media content source and the second digital media content source comprise broadcast or downloadable content.

4. The computer-readable storage medium according to claim 1, wherein the first set of metadata items and the second set of metadata items include time-based metadata items or non-time-based metadata items or both.

5. The computer-readable storage medium according to claim 1, wherein the method performed by the computer-executable instructions stored on the computer-readable medium further comprises:
    based on the transcribed metadata items within the first set of metadata items or the second set of metadata items, identifying a third digital media content source; and
    using the common format, identifying digital media content distributable via the third digital media content source,
    the digital media content distributable via the third digital media content source selected from the group consisting of: additional metadata items associated with the digital media content distributable via the first digital media content source or the second digital media content source; and advertising content.

6. The computer-readable storage medium according to claim 1, wherein the filter criteria are selected from the group comprising: user characteristics, user communities, user preferences, user profiles, client-side device characteristics, geographic locations, and times.

7. The computer-readable storage medium according to claim 6, wherein the filter criteria are predetermined or dynamically determined.

8. The computer-readable storage medium according to claim 6, wherein the method performed by the computer-executable instructions stored on the computer-readable medium further comprises:
    arranging the transcribed metadata items into a plurality of subsets of transcribed first and second metadata items based on the filter criteria; and
    storing the plurality of subsets in a computer-readable memory,
    the plurality of subsets stored at single location or in a distributed fashion.

9. The computer-readable storage medium according to claim 8, wherein the computer-readable memory is selected from the group consisting of: a client-side temporary or persistent memory, or network-side temporary or persistent memory.

10. The computer-readable storage medium according to claim 1, wherein the information usable to contact the particular source includes a tokenized Uniform Resource Locator.

* * * * *

UNITED STATES PATENT AND TRADEMARK OFFICE
CERTIFICATE OF CORRECTION

| | | |
|---|---|---|
| PATENT NO. | : 8,166,076 B2 | Page 1 of 1 |
| APPLICATION NO. | : 11/715512 | |
| DATED | : April 24, 2012 | |
| INVENTOR(S) | : Chen et al. | |

It is certified that error appears in the above-identified patent and that said Letters Patent is hereby corrected as shown below:

In Column 5, Line 6, delete "I 10" and insert -- 110 --, therefor.

In Column 13, Line 39, delete "301" and insert -- 301. --, therefor.

In Column 16, Line 60, In Claim 1, after "the" insert -- first set of metadata items and the at least one transcribed metadata item originating from the --.

Signed and Sealed this
Third Day of April, 2018

Andrei Iancu
*Director of the United States Patent and Trademark Office*